Aug. 27, 1963

J. G. FORD 3,102,159

TREATED CELLULOSIC MATERIAL AND ELECTRICAL
APPARATUS EMBODYING THE SAME

Filed March 23, 1962

WITNESSES

INVENTOR
James G. Ford
BY
ATTORNEY

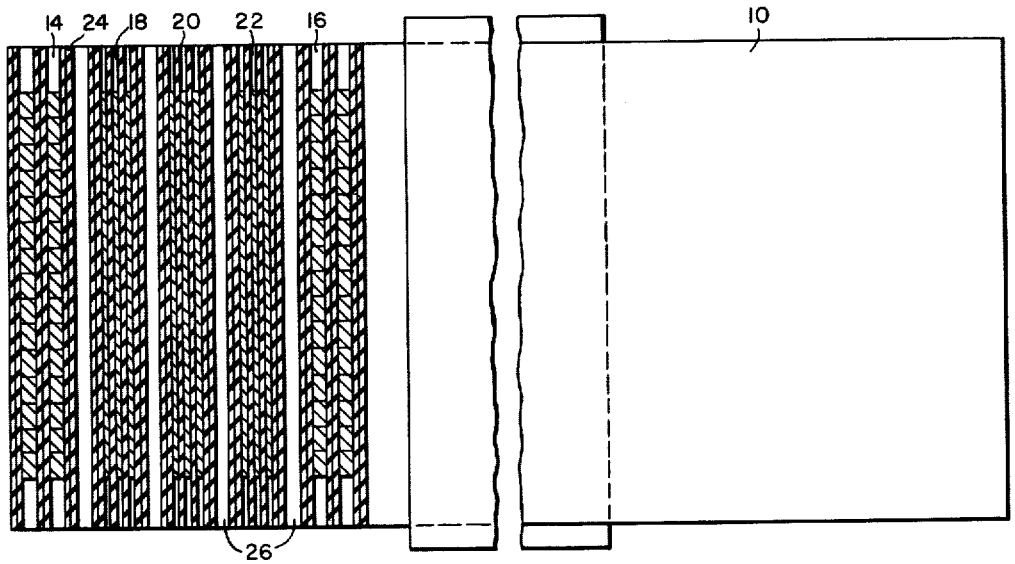
Fig. 3.
Fig. 4.
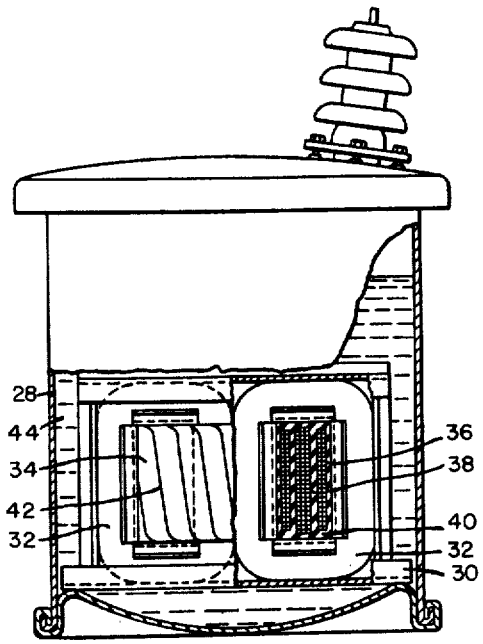
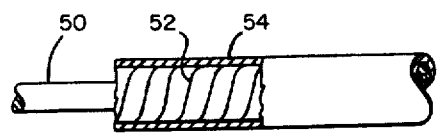
Fig. 5.

United States Patent Office 3,102,159
Patented Aug. 27, 1963

3,102,159
TREATED CELLULOSIC MATERIAL AND ELECTRICAL APPARATUS EMBODYING THE SAME
James G. Ford, Hickory Township, Mercer County, Pa., assignor to Westinghouse Electric Corporation, East Pittsburgh, Pa., a corporation of Pennsylvania
Filed Mar. 23, 1962, Ser. No. 182,029
5 Claims. (Cl. 174—17)

The present invention relates to stabilized cellulosic material and to electrical apparatus including such material. The invention further relates to cellulosic material characterized by greatly improved thermal stability and to improved cellulosic electrical insulation and electrical apparatus insulated therewith.

The present application is a continuation-in-part of my copending application Serial No. 839,166, filed September 10, 1959.

Cellulosic materials such as paper, cotton cloth, cotton tape, pressboard and wood have long been employed for many purposes. One use has been in the electrical industry as insulation for various types of electrical apparatus. Such materials represent a desirable source of electrical insulation from the standpoint of their economic advantages over other available types of insulation. Moreover, cellulosic insulation posesses good physical properties generally and satisfactorily initial dielectric strength.

However, cellulosic materials deteriorate rapidly at temperatures appreciably above 100° C. when in contact with air, and this deterioration is much more pronounced in the presence of liquid dielectrics such as are used in electrical transformers, particularly in oil, when oxidation takes place so that acids are produced from the oil. Both the physical and electrical properties are affected with the result that the insulation gradually loses its electrical insulating strength and its retained mechanical strength is rapidly dissipated.

The electrical and physical properties of cellulosic materials such as paper, cotton cloth, cotton tape, pressboard and wood deteriorate at an increasing rate when the temperatures rise above 100° C. whether exposed to air or in contact with fluid dielectric compositions. Thus, for example, after being immersed for only a few weeks in highly refined petroleum transformer oil at 120° to 150° C., paper will retain practically none of its original tensile strength. Generally, a length of fresh electrical grade kraft paper may be bent or flexed several hundred times before it will break. However, after only a week's immersion in transformer oil at 150° C. it will break upon being folded double once.

This deterioration in physical properties is accompanied by a corresponding decrease in electrical insulating properties. For these reasons it has been specified that, in electrical apparatus employing cellulosic insulation, the continuous operation temperatures shall not exceed about 105° C.

It is known that certain individual compounds can be used to stabilize cellulosic materials against thermal deterioration, but difficulties have been encountered in the past in using such materials to obtain optimum results. For example, it has been difficult to incorporate in cellulosic materials optimum quantities of a satisfactory stabilizer as part of a normal manufacturing process, as in paper making, without resorting to a separate operation such as impregnating a sheet of paper with the stabilizer in solution in an organic solvent or applying the stabilizer under abnormal conditions. Further, many known thermal stabilizers are not suitable for use as electrical insulation in electrical apparatus, particularly when immersed in the usual insulating fluids.

It has now been discovered that a combination of certain hereinafter recited critical amounts of melamine, which is relatively insoluble both in water and in oil, and dicyandiamide which latter is relatively more soluble in water and is essentially insoluble in oil not only has the characteristics of maintaining and improving the heat deterioration properties of cellulosic material at elevated temperatures, but additionally this combination of additives imparts enhanced electrical insulating properties thereto. It is also a requisite feature that the dicyandiamide converts to melamine at elevated temperatures of use.

More specifically, it has been discovered that a combination of melamine and dicyandiamide, in certain hereinafter recited critical amounts and proportions, thoroughly impregnated and distributed in the cellulosic fibers greatly improves not only the thermal stability of cellulosic insulation but, entirely unexpectedly, imparts to the insulation outstanding and synergistically improved electrical properties especially under normal and overload operating conditions. These properties are apparent, not only in the presence of liquid dielectrics, but are obtained to a high degree as well, when the insulation is employed in an atmosphere of air or, more particularly, in other gases which are rather inert such as nitrogen, fluorinated hydrocarbons or sulphur hexafluoride.

One object of this invention is to provide in cellulosic material a thermal stabilizer which has relatively low solubility in water and a compound relatively more soluble in water and having the property of converting to the first stabilizer under actual conditions of use of the material.

Another object of the invention is to provide cellulosic electrical insulation containing a synergistic combination of melamine and dicyandiamide applied thereto from aqueous solutions at about 50° C. and characterized by both improved thermal stability and outstanding electrical properties.

Another object of the invention resides in the provision of electrical insulation containing critical effective amounts of recrystallized melamine and dicyandiamide.

A still further object of the invention resides in the provision of electrical apparatus possessing greatly improved efficiency and operating life by virtue of the presence of the improved electrical insulation.

Other objects of the invention will become apparent from the following detailed description thereof. The description will be given with particular reference to the accompanying drawings, in which:

FIG. 3 is a view in perspective, partly in section, of a transformer core insulated with the novel cellulosic insulation of the invention;

FIG. 4 is a view in elevation, partly broken, of a transformer;

FIG. 5 is a view in elevation, partly in cross section, illustrating a cable.

Figure 1:
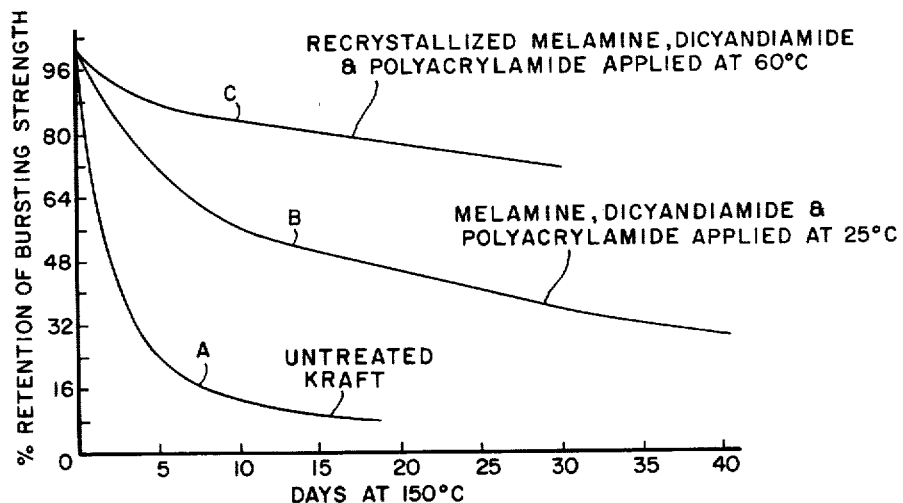
FIGURE 1 is a graph plotting Mullens bursting strength against days of aging of stabilized and unstabilized kraft paper in transformer oil at 150° C.

In accordance with the present invention, it is now possible to increase greatly the retention of both dielectric strength, as well as other electrical insulating properties, and mechanical strength of cellulosic insulation at elevated temperatures both in gases and in liquid dielectrics by uniformly distributing throught the interstices of the insulation certain critical amounts of the order of from 0.5 to 5% by weight of melamine and dicyandiamide. Both technical and recrystallized melamine have given excellent results. The amounts of the compounds employed are relatively small, but their presence in the cellulosic insulation imparts thereto greatly improve dphysical and electrical properties. The synergistic effect of the melamine and dicyandiamide combination in the cellulosic insulation may be further enhanced by the presence therewith of small amounts of polyacrylamide, i.e. of the order of about 0.1–1.0% based on the insulation weight. The relative proportions of melamine may be from 1 to 4 parts, the dicyandiamide from 5 to 1 parts and the polyacrylamide may be from 0.1 to 1 part.

It has been discovered that unexpectedly the dieletcric strength of paper, or other cellulosic material including gelatinized cellulose or so-called vulcanized hard fiber, treated with these compounds, when immersed in petroleum oil or chlorinated diphenyl dielectric liquid, is not only superior to the same paper in the untreated condition, but as the temperature increases, the dielectric strength increases and reaches a peak value at a temperature of from 125° C. to 150° C., or even higher, whereas untreated paper has begun to drop rapidly in dielectric strength at a temperature of from 25° C. to 50° C. lower than that at which the peak dielectric strength of the treated paper occurs. This is especially true with the thicker insulations, 0.020 inch thick and above.

The power factor of liquid dielectrics containing the treated cellulosic insulation immersed therein is lower than that of a similar dielectric liquid in contact with untreated cellulosic insulation over a wide range of temperature under aging test conditions. Further, material reductions in power factor occur when the liquid dielectric is an oil which contains oxidattion inhibitors, such as alkylated phenols, for example, p-tertbutylphenol and dibutylparacresol, in amounts of 0.01% to 4% or more since the treated paper appears to cooperate most effectively with the oil due to the presence of such inhibitors. A synergistic cooperative improvement takes place when the treated paper containing both melamine and dicyandiamide is in contact therewith since sludging of the oil occurs to a lesser extent while the power factor increases less than when untreated paper is employed therein.

Thus, the power factor of a refined petroleum oil (uninhibited) with kraft paper immersed therein was originally 0.008% while the color was 1 on the Lovibond scale, and after one year at 95° C., the power factor was 0.29% and color was 5+. When the oil was inhibited and tested with untreated kraft paper, the power factor was 0.36% and the color 5— after one year at 95° C. The bursting strength retention of the paper was substantially zero.

With kraft paper treated with a total of 3% of the stabilizing melamine, dicyandiamide and polyacrylamide compounds in accordance with this invention, the color was about 3.5 and the power factor was 0.07 after one year at 95°° C. Furthermore, the bursting strength retention of this sample was 94.1%.

Similarly improved results are obtained when the liquid dielectric comprises a halogenated hydrocarbon such for example as chlorinated diphenyl or mixtures of chlorinated diphenyl and chlorinated benzene or chlorinated aliphatic benzene. Chlorinated diphenyl with from 50% to 60% by weight of chlorine may be admixed with ethyltetrachlorobenzene and ethylpentachlorobenzene.

Several factors are involved in obtaining the benefits of the invention. First, the chemical additive compounds, melamine, dicyandiamide and polyacrylamide, should be present in the cellulosic insulation in total amounts within the range of from about 0.5% to about 5% by weight based on the weight of the cellulosic material. Although some benefits are obtainable using as little as about 0.02% of the stabilizing compounds, it is preferred to employ at least about 0.5%. A total of up to 10% of the compounds may be present, but the benefits are only slightly greater than with 5%. The presence of more than about 10% of the compounds is uneconomical and does not increase the degree of improvement beyond that obtained with 10%. Further the physical properties of the paper are impaired. Within this broader critical range, it is preferred to employ about 0.5% to about 5% by weight of the mixture of melamine and dicyandiamide, these amounts having been found to impart a high degree of improvement in the electrical insulating and thermal stability properties of the cellulosic insulation. The small amounts of polyacrylamide hereinbefore referred to are also desirably present.

Second, the stabilizing compounds should be present, in a substantially uniform distribution, intimately present throughout the interstices of the fibers comprising the cellulosic insulation to obtain optimum benefits. This requirement is readily met because of the fact that the stabilizing compounds of the invention are sufficiently soluble in water or water-alcohol solutions and substantially oil insoluble. To maintain the high dielectric properties and mechanical strength it is requisite that the stabilizing compounds be intimately distributed at all times within the cellulose fibers to obtain the hereinbefore discussed benefits, particularly where the insulation is to be immersed in a liquid dielectric such as oil during use. Where, for example, the stabilizing materials are merely suspended in the dielectric, an extended period of time may elapse before the stabilizers permeate the cellulosic insulation and function at reasonable levels of effectiveness. In some cases they do not reach optimum levels obtained by a thorough impregnation of the fibers.

Inasmuch as both melamine and dicyandiamide possess a suitable degree of solubility in water-alcohol mixture, they may be desirably applied in the form of solutions therein to thoroughly permeate the cellulosic insulation during its production.

In the case of paper or pressboard insulation in particular, incorporation of the compounds may be readily carried out in the paper mill. Paper is generally made on either a Fourdrinier machine or a cylinder type machine. In either method, the formed web of felted cellulosic fibers is transferred from the forming screen to a felt belt for drying. The web is thereby carried through a dryer which consists of a number of steam heated rolls after which, if desired, it is passed between calender rolls to impart a particular surface finish or density, and finally it is rolled for storage and shipment. Also, generally, the dryer is split so that the paper web partially drives in the first portion thereof and is finish dried in the second portion. Between the two sections of heated rolls a tank is usually positioned for application of sizing materials to the paper.

In practicing the present invention, the stabilizing compounds in aqueous solution, are present in and applied from the conventional sizing tank. The partially dried paper i.e. containing about 50% by weight of water, is passed through the aqueous solution of melamine and dicyandiamide and, by suitably adjusting the concentration and temperature of the solution, the paper absorbs a specified amount of the solution containing the stabilizing compounds. After this treatment, the paper passes through the second portion of the dryer. The temperature of the drying rolls is controlled so as to obtain sufficient drying of the paper and to leave the compounds distributed in the interstices thereof. The process is applicable equally to either the Fourdrinier or cylinder type paper-making machine.

It should be borne in mind that the water solubility of melamine is limited. For example, at a temperature of about 25° C. a saturated solution will contain only about 0.5% by weight of melamine. At about 75° C. there will be about 2.5% by weight of dissolved melamine, and at about 90° C. about 5.5% by weight of melamine will be in solution at substantial saturation. Therefore, although satisfactory results are obtained by carrying out the impregnation of the paper at substantially room temperature, greatly increased uptake of the compounds and of melamine, in particular, is obtained at elevated temperatures of the order of about 50°–90° C. or slightly higher. The above figures are related to the solubility characteristics of technical grade melamine. Recrystallized melamine seems to have a slightly higher degree of water solubility and, therefore, somewhat lower temperatures are applicable. Dicyandiamide, however, has a high degree of water solubility and may, therefore, be present in substantially any desired concentration.

A further fact to be considered is that the kraft paper, as stated earlier, contains about 50–60% of water at the time of this impregnation. Thus, there is a dilution factor involved with the result that the paper actually absorbs only about 40–60%, by weight, of the amount of melamine and dicyandiamide which is in solution. However, as stated above, the chemicals are intimately distributed throughout the fiber interstices subsequent to the absorption treatment. It will be appreciated, of course, that where dry paper, cloth, or the like is impregnated, the amount of the compositions absorbed will approximate the concentration thereof in the aqueous solution.

In order to more fully describe the benefits obtained by practicing the invention, the following illustrative examples are given. In each example, 1.75% dicyandiamide and about 0.9% of melamine by weight was added to kraft paper during its manufacture. In all instances, the paper was 10 mils thick and had a density of approximately 1. Blank samples were also prepared for comparison. Each of the samples of paper was wound with enameled wire into a coil and sealed in a tank filled with transformer oil. Sufficient current was circulated through the coils to generate a temperature of 140° C. The coil unit was removed after seven days and a Mullens bursting strength test was run on the aged paper in each sample. In Table I, the Mullens bursting strength retention values are given.

*Table I*

| | Top Part Coil | | Bottom Part Coil | |
|---|---|---|---|---|
| | Unstabilized Kraft | Stabilized Kraft | Unstabilized Kraft | Stabilized Kraft |
| Layer Insulation Number Between Windings Inside of Coil: | | | | |
| 1–2 | 11.5 | 77.0 | 3.70 | 75.0 |
| 2–3 | 11.3 | 75.0 | 28.6 | 69.5 |
| 3–4 | 14.0 | 68.0 | 36.2 | 76.0 |
| 4–5 | 19.7 | 63.5 | 34.4 | 77.0 |
| 5–6 | 22.8 | 55.5 | 36.5 | 73.5 |
| 6–7 | 28.4 | 62.5 | 39.5 | 74.0 |
| 7–8 | 32.0 | 59.0 | 43.4 | 70.0 |
| 8–9 | 43.4 | 53.5 | 40.4 | 67.0 |
| 9–10 | 37.2 | 66.0 | 42.0 | 77.0 |
| 10–11 | 41.5 | 71.5 | 46.0 | 82.0 |
| 11–12 | 47.0 | 61.0 | 54.0 | 82.0 |
| Outside of Coil: | | | | |
| 12–13 | | 82.0 | | |
| Average Retention, 1% | | 28.1 | 39.9 | 74.8 |

From the above physical data, it will be seen that whereas the kraft paper containing no stabilizing agent retained only 28.1% of its original bursting strength, the novel addition agents imparted to the treated kraft paper such resistance to aging that the paper retained a minimum of 65.4% or more of its original bursting strength.

FIG. 1 of the drawing graphically illustrates the results of accelerated aging tests wherein the curve A is a plot of the strength remaining in 10 mil thick kraft paper, such as is employed for transformer insulation, against days of aging at 150° C. in transformer oil. The curve A represents kraft paper which has not been stabilized by the compounds of this invention. As illustrated on the drawing, the curve A shows a rapid decrease in Mullens bursting strength to a value of only 8% of its original strength after only 11 days of aging. After that relatively short aging period, the paper was so brittle that it could not be bent without breaking and cracking.

Curve B of FIG. 1, on the other hand, illustrates the benefits imparted to kraft paper by the incorporation therein of the stabilizing compounds of this invention. Specifically, curve B illustrates aging strength of kraft paper stabilized by the addition of 3% by weight of a stabilizing composition of this invention applied from solution at about 25° C. The stabilizing composition contained 1.0% by weight of dicyandiamide, 1.0% by weight of melamine, and 1.0% by weight of polyacrylamide. As illustrated in FIG. 1, after 30 days of aging at a temperature of 150° C., over 35% of the original Mullens bursting strength of the paper was retained.

Curve C illustrates the combined effects of the aging strength of kraft paper containing 1.0% by weight of recrystallized melamine, 2.0% by weight of dicyandiamide, and 0.17% by weight of polyacrylamide wherein the stabilizing compounds were absorbed from an aqueous solution maintained at about 60° C. Surprisingly, after 30 days aging this sample retained about 74% of its original bursting strength. When it is realized that technical grade melamine is about 99.9% pure, it is evident that the removal of less than 0.1% of impurities therefrom does not account for the great improvement in the strength retention of the kraft paper containing melamine which has been recrystallized from water solution. It therefore is clear that the higher impregnating temperature contributes importantly to obtaining better distribution of the stabilizing compounds throughout the interstices of the paper. It is therefore an important feature of the invention to impregnate the cellulosic material with the compounds from hot solutions of 50° C. and higher.

The synergistic effect of the novel combination of stabilizing agents of the invention is further emphasized by the following transformerette test results. The transformerettes for the test comprise coils of magnet wire, magnetic steel and paper insulation all immersed in oil. In the tests, the treated and untreated kraft paper was tested as were the samples for the data recorded in Table I. In each of the samples, the paper contained 3% by weight of the respective stabilizing agent. The samples were subjected for seven days to the action of transformer oil at 140° C. The paper was then removed and tested. Table II sets forth the percentage of bursting strength retained. Each retention figure represents the average value of at least five samples.

*Table II*

Percent retention of bursting strength

Sample:
Blank—untreated kraft _____ 38.9
Dicyandiamide—3% _____ 76.7
Melamine—3% _____ 84.0
1 part melamine, 2 parts dicyandiamide, 0.1 part polyacrylamide—total 3% _____ 94.4

It will be appreciated from these data that paper treated with the combination of melamine, dicyandiamide plus the small amount of polyacrylamide possesses thermal stability which is greatly improved over paper treated only with an equal amount of the individual components of the mixture.

Figure 2:
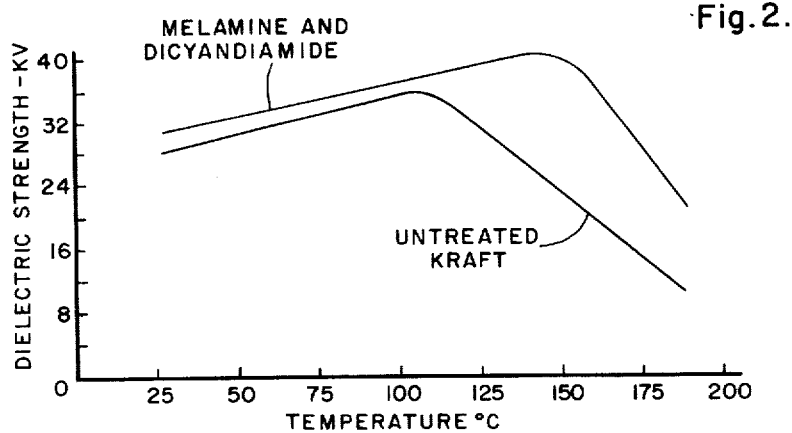
FIG. 2 is a graph plotting dielectric strength retention of stabilized and unstabilized kraft paper aged in transformer oil at 150° C.

Tests were also made of the dielectric strength of melamine-dicyandiamide treated paper. It will be noted from FIG. 2, which was derived from such dielectric tests, that the so-treated kraft papers possess greatly improved dielectric strength retention with increasing temperaturts in comparison with an untreated kraft paper.

Using the same treated paper containing about 3% by weight of a mixture of melamine and dicyandiamide, a transformer coil was wound in a fashion as illustrated in FIG. 3. The numeral 10 represents the treated kraft paper which is wound around the individual coils and which is wound between the high and low voltage coils of the transformer. Thus, the transformer coil comprises low voltage coils 14 and 16, as well as high voltage coils 18, 20 and 22, insulated by layer-to-layer application of the treated paper. In addition, the low voltage coil 14 is insulated from the treated winding-to-winding by insulation 24. The electrical conductors employed may comprise enameled wire which resists softening at temperatures of up to 250° C. Suitable enamels are epoxy resin enamels, polyester resin enamels such as isophthlate-glycolmaleate resins, silicone modified enamels and polyvinyl formal-phenolic resin enamels. The enamels may be applied directly on copper wire or may be employed with asbestos or glass fiber wrapping or other fibrous materials. In the finished transformer, a liquid dielectric will fill the channels 26 and will, as well, completely permeate the paper insulation. Subsequent to being wound and assembled the entire assembly is vacuum treated to remove air and moisture from the paper and the coil is thereafter baked to eliminate fully any moisture.

Referring to FIG. 4 of the drawing, a transformer is prepared in accordance with the present invention. The transformer comprises a tank 28 carrying a support 30 internally on which magnetic core 32 and a coil 34 are disposed. Coil 34 comprises a high voltage winding 36 and a low voltage winding 38, each insulated with a wire enamel composition which resists softening at temperatures up to about 250° C. The turns of the windings 36 and 38 are insulated by wrappings comprising the stabilized cellulosic insulation of this invention. The windings are also insulated from one another by stabilized cellulosic insulation 40, prepared according to the present invention, which comprises paper, cotton, or other cellulosic insulation. An exterior cellulosic wrapping 42 of cloth or paper may be applied to the coil 34. In some cases, pressboard, wood or cardboard spacers or various other cellulosic products may be applied to the electrical windings.

A liquid dielectric 44 is disposed within the tank 28 to cover the core 32 and coil 34 in order to insulate them and to dissipate the heat produced in operation. As stated hereinbefore, where desired the liquid dielectric may contain a small amount of an oxidation inhibitor.

FIG. 5 of the drawing illustrates an electrical conducting cable comprising an electrical conductor 50 having cellulosic insulation 52 wrapped thereabout and an outer metallic sheath covering 54. The cellulosic insulation 52 is stabilized material which has been treated according to the present invention.

Figure 6:
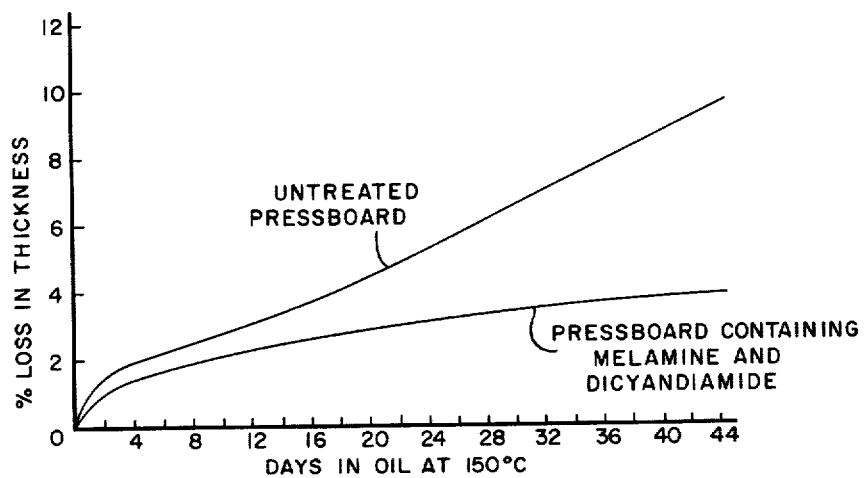
FIG. 6 is a graph illustrating loss in thickness of pressboard immersed in oil at 150° C. over a period of several days.

The novel treated insulation of this invention enables the transformer construction to be more solid and tighter because the treated cellulosic spacers and other components lose less than half the thickness loss on thermal aging exhibited by untreated pressboard, kraft paper and other cellulosic materials. The actual pressboard thickness loss is illustrated in FIG. 6.

It has also been found that where certain properties are desired, such as higher initial tensile strength of paper and waterproofness, that certain resins can be incorporated in the paper in the process of beating the pulp. These resins can be introduced in finely divided or emulsified form in the beating of the pulp or they can be introduced later from organic solution. Small amounts of up to several percent of resins such as phenolic, epoxy, acrylic, diallylphthalate, etc. have been found to be compatible with the stabilizing compounds previously mentioned and further enhance mechanical, electrical and thermal stability in the finished product.

It will be understood that the above description and drawing is only illustrative and not limiting.

I claim as my invention:
1. An improved sheet cellulosic product having increased stability and resistance to thermal deterioration, and particularly adapted for use as electrical insulation in electrical apparatus, the sheet cellulosic product comprising cellulosic fibers in sheet form, the sheet having uniformly distributed throughout its interstices from about 0.5% to about 5% by weight based on the weight of the cellulosic fibers of a mixture of melamine and dicyandiamide, the proportions being 5 to 1 parts of dicyandiamide and 1 to 4 parts of melamine, and from about 0.1% to about 1% by weight based on the weight of the cellulosic fibers of polyacrylamide.

2. An improved sheet cellulosic product adapted for use in electrical apparatus in combination with a fluid dielectric impregnant, the product comprising cellulosic fibers in sheet form, the sheet having uniformly distributed throughout its interstices, based on the weight of the cellulosic fibers, about 0.7 to 1.5% of melamine, about 2 to 3% of dicyandiamide, and about from 0.1% to 1% by weight of polyacrylamide.

3. An improved sheet cellulosic product adapted for use in electrical apparatus in combination with a fluid dielectric impregnant, the product comprising cellulosic fibers in sheet form, the sheet having uniformly distributed throughout its interstices, based on the weight of the cellulosic fibers, about 1% of melamine, about 2% of dicyandiamide, and about 0.15–0.2% by weight of polyacrylamide.

4. In electrical apparatus comprising in combination, a container, an electrical conductor disposed in the container, cellulosic insulation applied to the conductor, a petroleum hydrocarbon oil dielectric within the container surrounding the conductor and impregnating the cellulosic insulation, the petroleum hydrocarbon oil containing at least 0.01% by weight of an oxidation inhibitor, the improvement comprising incorporating in the cellulosic insulation from 0.5% to 5% of the weight of the cellulosic insulation as a relatively uniform distribution therein of a mixture of melamine and dicyandiamide in the proportions of from about 5 to 1 parts of dicyandiamide and 1 to 4 parts of melamine, and from 0.1 to 1.0% of polyacrylamide, the melamine, dicyandiamide and polyacrylamide providing for stabilizing the cellulosic insulation against thermal deterioration whereby the electrical apparatus may be operated at higher temperatures and the presence of the melamine, dicyandiamide and polyacrylamide in contact with the oxidation inhibited petroleum oil providing for a reduction in sludging and deterioration of the petroleum oil.

5. In elecarical apparatus comprising, in combination, an electrical conductor, sheet cellulose insulation disposed about the electrical conductor, and a fluid dielectric disposed about the insulated conductor, the improvement which comprises incorporating in the sheet cellulose insulation from a total of from 0.02% to 10% of the weight of the cellulose insulation of a mixture of melamine, dicyandiamide and polyacrylamide, the polyacrylamide amounting to from 0.1 to 1% of the weight of the cellulose insulation.

References Cited in the file of this patent

UNITED STATES PATENTS

| | | |
|---|---|---|
| 2,539,558 | Studeny | Jan. 30, 1951 |
| 2,665,733 | Buckwalter | Jan. 12, 1954 |
| 2,665,734 | Buckwalter | Jan. 12, 1954 |
| 2,722,561 | McCulloch | Nov. 1, 1955 |
| 2,991,326 | Ford et al. | July 4, 1961 |

UNITED STATES PATENT OFFICE
CERTIFICATE OF CORRECTION

Patent No. 3,102,159                                  August 27, 1963

James G. Ford

It is hereby certified that error appears in the above numbered patent requiring correction and that the said Letters Patent should read as corrected below.

Column 5, Table I, first column, last line thereof, for "Average Retention, 1%" read -- Average Retention % --; same table under the heading "Unstabilized Kraft", first occurrence, last line thereof, insert -- 28.1 --; same table, under the heading "Stabilized Kraft", first occurrence, last line thereof, for "28.1" read -- 65.4 --.

Signed and sealed this 28th day of April 1964.

(SEAL)
Attest:

ERNEST W. SWIDER                                  EDWARD J. BRENNER

Attesting Officer                                    Commissioner of Patents